United States Patent
Moss et al.

[11] Patent Number: 5,937,133
[45] Date of Patent: Aug. 10, 1999

[54] OPTICAL BACKPLANES

[75] Inventors: Claire J Moss, Chelmsford; Paul T Sharp, Maldon; Michael M Murphy, Billericay; Steve G Tyler, Witham, all of United Kingdom

[73] Assignee: GEC-Marconi, Limited, United Kingdom

[21] Appl. No.: 08/874,234

[22] Filed: Jun. 13, 1997

[30] Foreign Application Priority Data

Jun. 13, 1996 [GB] United Kingdom ............. 9612401

[51] Int. Cl.⁶ .................................. G02B 6/00
[52] U.S. Cl. ................ 385/137; 385/49; 385/130; 385/131
[58] Field of Search ................ 385/137, 14, 130, 385/49, 122, 131, 46

[56] References Cited

U.S. PATENT DOCUMENTS

| | | | |
|---|---|---|---|
| 4,943,136 | 7/1990 | Popoff | 385/46 |
| 5,144,691 | 9/1992 | August et al. | 385/88 |
| 5,204,925 | 4/1993 | Bonanni et al. | 385/89 |
| 5,425,831 | 6/1995 | Grimes et al. | 385/15 |

FOREIGN PATENT DOCUMENTS

| | | |
|---|---|---|
| 43 09 279 A1 | 9/1994 | Denmark . |
| 62123406 | 6/1987 | European Pat. Off. . |
| 0 511 779 A2 | 11/1992 | European Pat. Off. . |
| 2 156 604 | 10/1985 | United Kingdom . |
| 2 292 466 | 2/1996 | United Kingdom . |
| WO 92/00538 | 1/1992 | WIPO . |
| WO 96/07116 | 3/1996 | WIPO . |

*Primary Examiner*—Phan T. H. Palmer
*Attorney, Agent, or Firm*—Kirschstein, et al.

[57] ABSTRACT

An optical backplane is formed by defining channels in the plane of a polyimide layer 55, laying optical fibres 56, 57 in each channels, retaining the fibres 56, 57 using an adhesive and bonding an epoxy resin layer 58 to the polyimide layer 55 to form a flexible structure 54. The flexible structure 54 is made rigid by bonding epoxy glass FR4 layers 60, 61 to either side of the flexible structure 54. A flexible ribbon 53 with an optical fibre 57 contained therein is formed as an integral portion of the flexible structure 54 using spacers 59, 62 to define a ribbon region and to aid removal of the rigid layers 60, 61 in the ribbon region.

45 Claims, 5 Drawing Sheets

OPTICAL BACKPLANES

BACKGROUND OF THE INVENTION

This invention relates to an optical backplane for the routing and protection of optical fibres.

Advanced communication networks require the use of optical fibre technology for the purpose of providing high band width and multiplexing capability and their installation is proceeding rapidly, worldwide. Their use for terrestrial based networks is becoming commonplace and there are also increasing requirements for optical networks on mobile platforms for both civil and military use.

Such networks require optical fibre and component management at the exchange/rack level and technologies are evolving to address this market.

BRIEF SUMMARY OF INVENTION

It is an object of this invention to provide an optical backplane for the routing and protection of optical fibres and to also provide a method of producing such an optical backplane.

According to a first aspect of the present invention an optical backplane, comprises a layer of material defining at least one channel within the plane of the layer, at least one optical fibre located within each channel, and a crossover region formed where at least two of said channels intersect, one of said channels being formed sufficiently deep to permit its said optical fibre located in that channel to cross underneath said optical fibre located within said other channel.

Preferably, said channels may intersect substantially at right angles in said crossover region, said channels may be locally widened at said crossover region and said locally widened portion of said channels may be filled with a set resin. A base for said deeper formed channel may be defined by a stop layer.

According to another aspect of the present invention an optical backplane, comprises a layer of material defining at least two channels within the plane of the layer, each said channel being formed by ablation of said material, at least one optical fibre located within each channel, and a crossover region formed where at least two of said channels intersect, one of said channels being formed sufficiently deep to permit its said optical fibre located in that channel to cross underneath said optical fibre located within said other channel.

Preferably, a base for at least one of said channels may be defined by a stop layer. Each said optical fibre may be laid in its said channel and retained in position using an adhesive. A bend in at least one said channel may have a radius greater than 10 mm.

According to a further aspect of the present invention an optical backplane, comprises a layer of material defining at least two channels within the plane of the layer, at least one optical fibre located within each channel, a crossover region formed where at least two of said channels intersect, one of said channels being formed sufficiently deep to permit its said optical fibre located in that channel to cross underneath said optical fibre located within said other channel, and a further layer of material bonded to said layer to enclose each said optical fibre within its channel.

Preferably, said further layer of material may be formed from a cured resin which extends into each said channel to enclose each optical fibre. The said material may be formed from polyimide and said layers may form a flexible structure. A rigid layer may be bonded to one side of said flexible structure to provide a rigid structure and further rigid layer may be bonded to the reverse side of said flexible structure. The rigid layers may be formed from epoxy glass resin and said layers may be bonded by an epoxy resin.

Preferably, said layers may have at least one aperture containing an optical component connected to at least one of said optical fibres. The said layers may have at least one aperture containing an electro-optical component connected to at least one of said optical fibres. Each aperture may be filled with a set resin.

A printed circuit may be carried by a surface of at least one of said layers, at least one of said layers may have at least one aperture containing a component connected to said printed circuit and each said aperture may be filled with a set resin.

According to another aspect of the present invention an optical backplane, comprises a layer of material defining at least two channels within the plane of the layer, at least one optical fibre located within each channel, a crossover region formed where at least two of said channels intersect, one of said channels being formed sufficiently deep to permit its said optical fibre located in that channel to cross underneath said optical fibre located within said other channel, a further layer of material bonded to said layer to enclose each said optical fibre within its channel and said layers forming a flexible structure, at least one rigid layer bonded to at least one said of said flexible structure to provide a rigid structure, and said flexible structure formed to extend beyond said rigid layer to define a flexible optical ribbon.

Preferably, said flexible optical ribbon may terminate in an optical connector, and at least one said optical fibre may be located in a communal channel immediately adjacent said optical connector and each optical fibre is located in a laterally spaced individual channel which converges into the communal channel.

According to another aspect of the present invention a method of manufacturing an optical backplane, comprises the steps of defining at least one channel within the plane of a layer of material, locating at least one optical fibre within each channel, and defining a crossover region for at least two of said channels by forming one of these channels sufficiently deep to permit its optical fibre to cross underneath said optical fibre within another channel.

Preferably, the method may include laying each said optical fibre in its said channel and applying an adhesive between each optical fibre and its channel. The method may include forming a bend in at least one said channel with a radius greater than 10 mm.

The method may include forming channels such that they are locally wider in said crossover region and include filling said locally widened portion of said channels with a setting resin.

According to another aspect of the present invention a method of manufacturing an optical backplane, comprises the steps of forming at least two channels within the plane of a layer of material by ablating said material, and locating at least one optical fibre within each channel, and defining a crossover region for at least two of said channels by forming one of these channels sufficiently deep to permit its optical fibre to cross underneath said optical fibre within another channel.

Preferably, the method may include using a mask superimposed over said layer to expose only those areas of material that are to be ablated, using an Excimer laser to ablate the material and using a stop layer to define a base for at least one of the channels.

According to another aspect of the present invention a method of manufacturing an optical backplane, comprises the steps of defining at least two channels within the plane of a layer of material, locating at least one optical fibre within each channel, and defining a crossover region for at least two of said channels by forming one of these channels sufficiently deep to permit its optical fibre to cross underneath said optical fibre within another channel, and bonding a further layer of material to said layer to enclose each said optical fibre.

The said layers may form a flexible structure, and the method may include bonding a rigid layer to one side of said flexible structure, bonding a further rigid layer to the reverse side of said flexible structure and introducing an epoxy resin between said layers and bonding them together under pressure over a surface area of said layers.

The method may include forming at least one aperture in at least one of said layers, positioning an optical component within said aperture and connecting that component to at least one of said optical fibres and also include for at least one aperture in at least one of said layers, positioning an electro-optical component within said aperture and connecting that component to at least one of said optical fibres.

Preferably the method may include forming a printed circuit on a surface of at least one of said layers and forming at least one aperture in at least one of said layers, positioning a component within said aperture and connecting that component to said printed circuit.

According to another aspect of the present invention a method of manufacturing an optical backplane, comprises the steps of defining at least one channel within the plane of a layer of material, locating at least one optical fibre within each channel, bonding a further layer of material to said layer to enclose each said optical fibre and to form a flexible structure, bonding a rigid layer to one side of said flexible structure, and spacing said rigid layer from said flexible structure to which it is to bond with spacer material in specified regions and using a bond inhibiting agent to prevent bonding of said spacer material to either said rigid layer or to said flexible structure, and then removing portions of said rigid layer in said specified regions to expose those portions of the flexible structure.

Preferably the method may include defining each said channel in the exposed portions of said flexible structure such that the pitch between each optical fibre enables interconnection with a multi way ribbon connector.

BRIEF DESCRIPTION OF THE DRAWINGS

The invention is now described, by way of example only, with reference to the accompanying drawings, in which.

DETAILED DESCRIPTION

Figure 1:
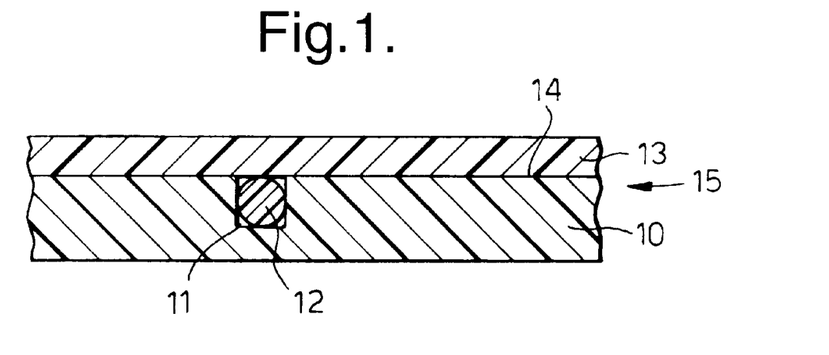
FIG. 1 illustrates in cross sectional view a first embodiment of a flexible optical backplane.

In FIG. 1, there is illustrated a first embodiment comprising a layer 10 formed from a polyimide material with a channel 11 defined in the polyimide with the plane of the layer 10 and an optical fibre 12 located within the channel 11. The defining of the channel 11 will be described with reference to FIGS. 4 and 5 below. A further layer 13 also formed of polyimide material is bonded to layer 10 with epoxy resin 14 and pressure applied over the plane of the layers 10 and 13, in this manner a flexible structure 15 is constructed.

Figure 2:
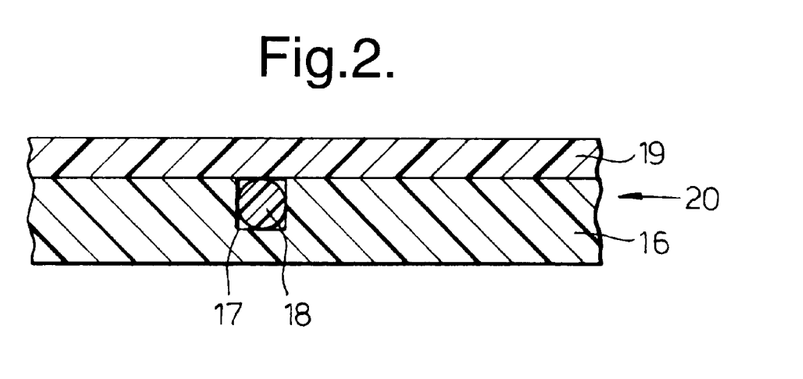
FIG. 2 illustrates in cross sectional view a second embodiment of a flexible optical backplane.

An alternative to the construction described with reference to FIG. 1 is illustrated in FIG. 2. A second embodiment comprising a layer 16 formed from a polyimide material with a channel 17 defined in the polyimide with the plane of the layer 16 and optical on fibre 18 located within the channel 17. The defining of the channel 17 will be described with reference to FIGS. 4 and 5 below. A further layer 19 formed of a curing type material, such as a low temperature (85° C.) epoxy resin, is applied under pressure over the plane of the layer 16, in this manner an alternative flexible structure 20 is constructed.

It will be appreciated that the flexible structure 20 when descried below could be readily replaced by the flexible structure 15 and that the description will only refer to the flexible structure 20 for clarity.

Figure 3:
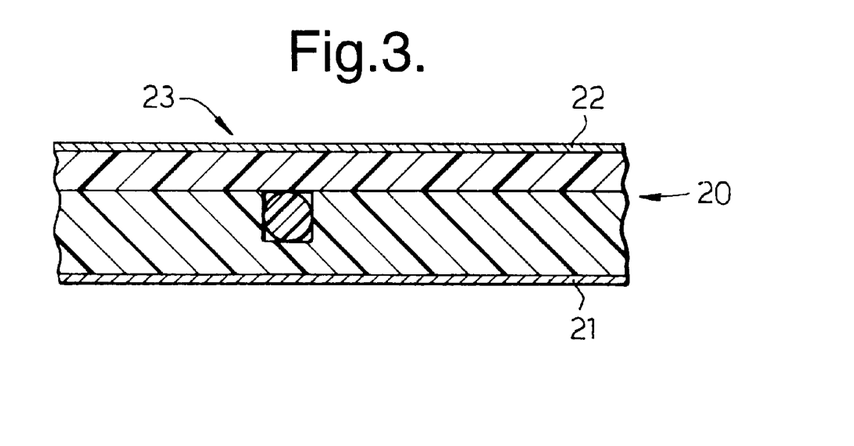
FIG. 3 illustrates in cross sectional view a rigid optical backplane.

When the optical backplane is to be used in conjunction with passive and/or active components the flexible structures 15 or 20 are made rigid to provide a stable base to which to attach the components. In FIG. 3, there is illustrated a flexible structure 20, wherein the flexible structure 20 is bonded to a layer 21 of epoxy glass FR4 on one side of the plane of the flexible structure 20 with an epoxy resin. Bonding of the layer 21 to the flexible structure 20 provides rigidity to the flexible structure 20. Further rigidity for the flexible structure 20 is provided by bonding a further layer 22 of epoxy glass FR4 to the opposite side of the flexible structure 20 with epoxy resin. In this manner a rigid structure 23 is constructed.

Passive or active components can be secured to the structure 23 and/or interconnected with optical fibres and optical components within the optical backplane in accordance with conventional printed circuit board and optical connection techniques. The external surfaces of the layers 21 and 22 or alternatively the internal surfaces of the layers 21 and 22 can be machined to provide areas to accommodate these components on the external surface of the layers 21 and 22 or between the layers 21 and 22 and the flexible structure 20. Apertures can be provided between and/or in layers to enable connection of these components to the optical fibres. In the case of active components power is provided using conventional printed circuit board technology.

Figure 4:
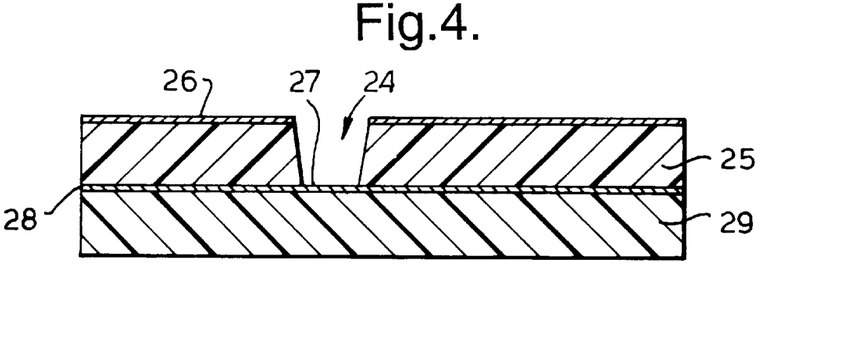
FIG. 4 illustrates in cross sectional view the formation of a channel within a layer of polyimide using a stop layer.

In FIG. 4, a channel 24 is formed in a polyimide layer 25 using an Excimer laser in accordance with one of the two following methods. A polyimide layer having a copper mask 26 transposed thereon is exposed to in Excimer laser passing over exposed portions provided by the copper mask 26, in either a time based or number of passes fashion, to ablated the polyimide and form the channel. Alteratively, as illustrated in FIG. 4, the channel 24 is defined in the polyimide layer 25 by transposing a copper mask 26 on the surface of the polyimide layer 25 and exposing the etched portions to an Excimer laser to ablated the polyimide layer 25 and form the channel 24. The base 27 of the channel 24 is defined by a copper stop layer 28 which prevents the Excimer laser machining further.

When a channel 24 with greater depth in localised areas is required, further ablation with the Excimer laser will remove the stop layer 28 to allow the Excimer laser to penetrate into a further polyimide layer 29 thereby providing greater depth.

Figure 5:
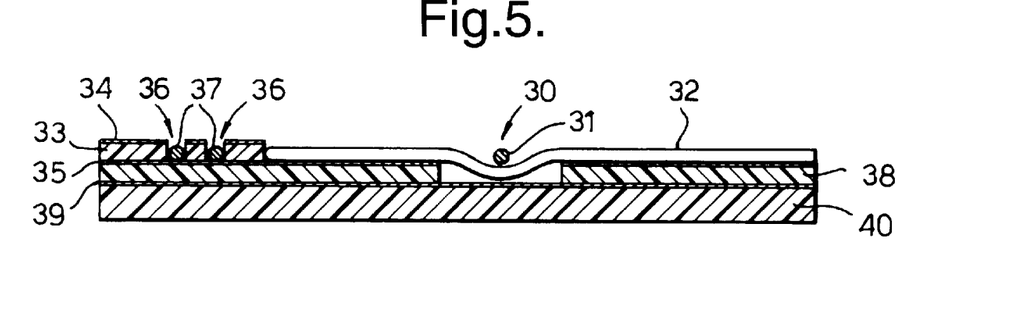
FIG. 5 illustrates, in cross section view the formation of an optical fibre crossover region within a layer of polyimide using a ether stop layer.

Greater depth is required, for example, for a crossover region 30 as illustrated in FIG. 5. Here a first optical fibre 31 is required to pass over a second optical fibre 32 so a greater depth is provided by ablating a first layer of polyimide 33 having a copper mask 34 with an Excimer laser. Ablation with the laser is halted by a first copper stop layer 35. The first process of ablation provides channels 36 for optical fibre 37 and optical fibres 31 and 32, with the exclusion of the crossover region 30, in the polyimide layer 33.

In the crossover region 30 the stop layer 35 is further exposed to the Excimer laser until it is burnt away and ablation of a second layer of polyimide 38 allows the necessary depth to provide the crossover region 30 for optical fibres 31 and 32. The base of the crossover region 30 is defined by a second copper stop layer 39 to permit penetration into a further polyimide layer 40.

It will be noted that ablation can be achieved using any form of heat generating means.

Figure 6:
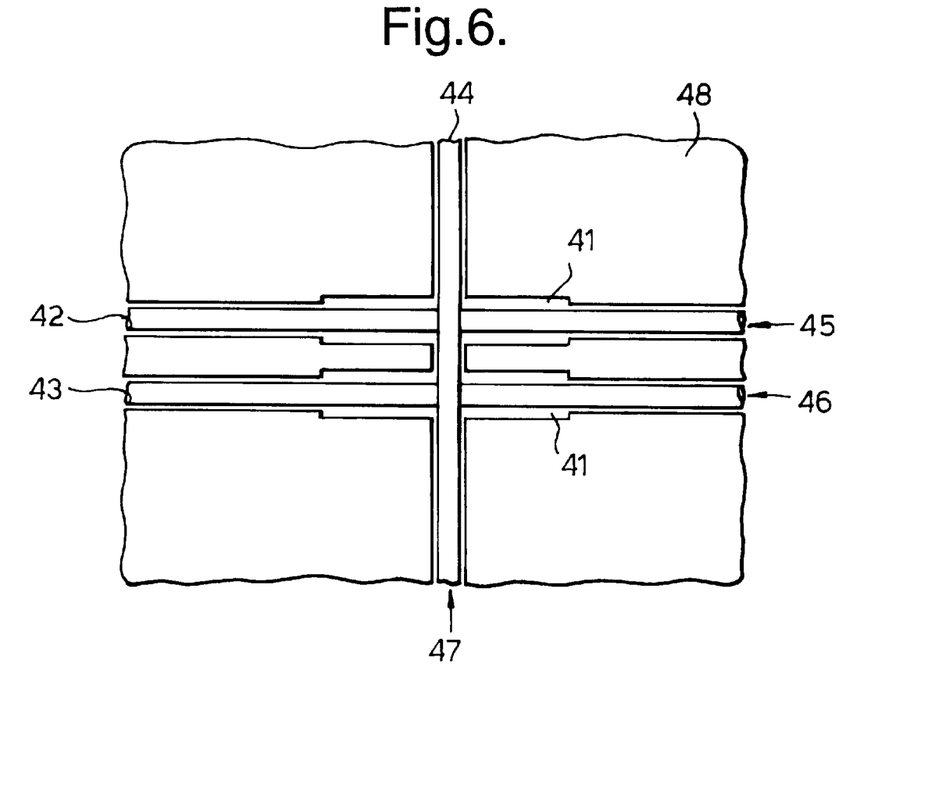
FIG. 6 illustrates in plan view enlarged channel localised to the crossover region.

In FIG. 6, two crossover regions 41 are illustrated for optical fibres 42, 43 and 44 in defined channels 45, 46 and 47 in a polyimide layer 48. In the crossover regions 41 the channels 45 and 46 are enlarged to allow greater flow of epoxy resin around and under the optical fibres 42 and 43. Where many optical fibres crossover in close proximity a large communal expanse can be provided for filling with epoxy resin.

Figure 7:
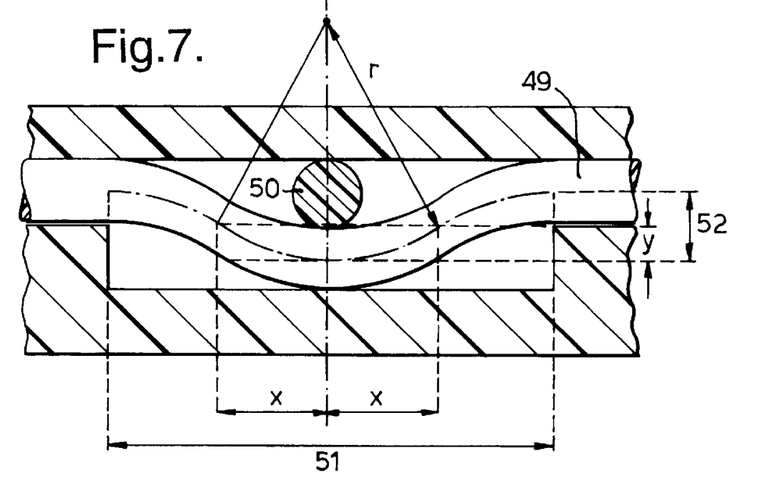
FIG. 7 illustrates in cross sectional diagrammatic view a technique for the calculation of the minimum radius for an optical fibre to bend under another optical fibre in the crossover region.

In FIG. 7, the bending of an optical fibre 49 at a crossover region to pass under another optical fibre 50 must not exceed a minimum recommended bend radius, for this application the bend radius of the optical fibre 49 should be great than or equal to 10 millimeters. With reference to FIG. 7, the theoretical bend radius can be calculated using the formula, $$r = \frac{x^2 + y^2}{2y}$$

wherein, r is the radius in millimeters and the dimensions x and y are the bend distances of the core of the optical fibre 49 underneath optical fibre 50 and the distance between the core of the optical fibre 49 from the optical fibre 50, respectively.

For example, given that the length of a crossover 51 is 7.3 millimeters and that a core bend deflection 52 is 0.15 millimeters then, $$x = \frac{7.3}{4} = 1.825 \text{ millimeters}$$

$$y = \frac{0.15}{2} = 0.075 \text{ millimeters}$$

$$r = \frac{1.825^2 + 0.075^2}{2 \times 0.075} = 22.2 \text{ millimeters}$$

In this case the bend radius r is greater than the bend radius minimum of 10 millimeters and therefore acceptable.

A further design rule, to reduce the cross talk and loss is to only intersect the optical fibres at right angles relative to one another.

Figure 8:
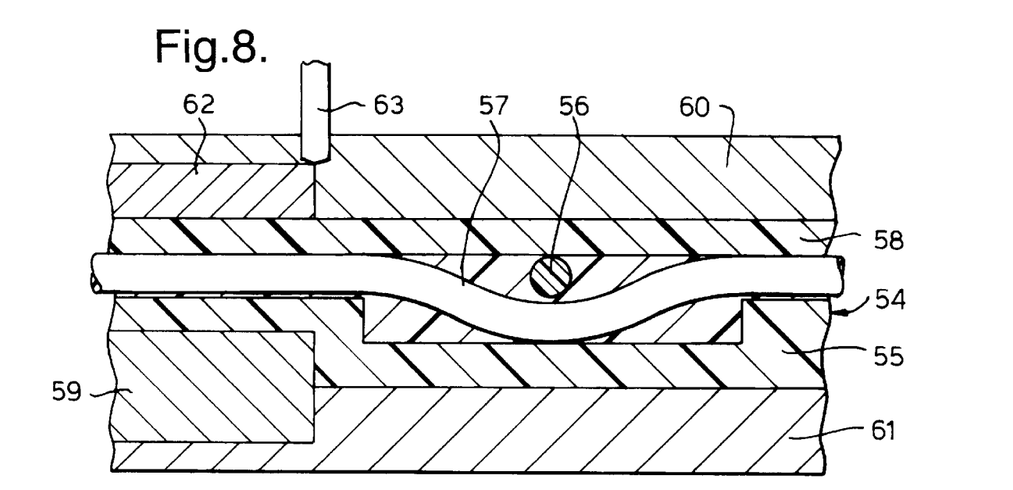
FIG. 8 illustrates in cross sectional view the formation of a ribbon enclosing an optical fibre.

The flexible structures 15 or 20 are also used to form flexible ribbons for interconnection with other optical backplanes and/or optical components. In FIG. 8, a ribbon 53 is formed as an integral part of a flexible structure 54 by forming a rigid structure from a layer of polyimide 55 having defining channels for optical fibres 56 and 57, an epoxy resin layer 58 bonded to the polyimide 55. As the ribbon 53 will when formed be thinner than the flexible structure 54 it is necessary to machine the polyimide layer 58 to provide an area to retain a spacer 59. Machining can be by way of ablation with Excimer laser of the polyimide layer 55. Spacer 59 is coated with a layer of material which inhibits adhesion to the polyimide layer 55.

The flexible structure 54 is made rigid by bonding rigid layers 60 and 61, formed of epoxy glass FR4, to either surface of the flexible structure 54. Rigid layer 61 is also machined to co-operate with spacer 59. The area machined into the rigid layer 61 will not bond to the spacer 59 as the spacer has been coated in a material which inhibits adhesion to the rigid layer 61.

The rigid layer 60 is also machined to provide an area to retain a spacer 62 between the machined area and the epoxy resin layer 58. The spacer 62 is also coated with a layer of material which inhibits adhesion to either the epoxy resin 58 on the rigid layer 60.

The flexible structure 54 is bonded between the rigid layers 61 and 62 and pressure applied to the structure to aid correct bonding. When curing of the bond is complete a router machine bit 63 is used to cut through the rigid layers 60 and 61 in the area of the spacers 59 and 62. The cut areas will drop away with the spacers 59 and 62 leaving the flexible structure 54 in this region undamaged by the process. There is now provided the ribbon 53 with an optical fibre 57 therein.

Figure 9:
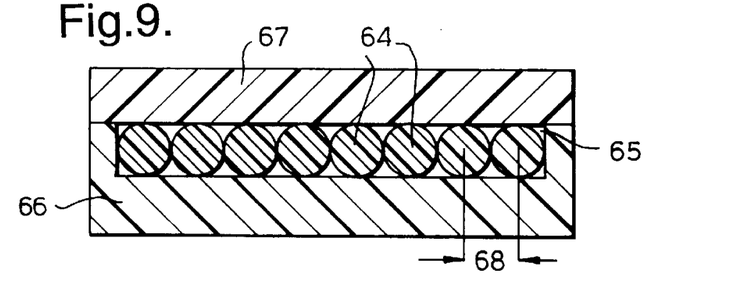
FIG. 9 illustrates in cross sectional view, normal to the longitudinal axis of the ribbon, the optical fibres in position for connection with an optical fibre interconnector.

A number of optical fibres can be enclosed in, a single ribbon, as illustrated in FIG. 9. The optical fibres 64 are laid in a communal channel 65 defined in a polyimide layer 66 and bonded to an epoxy resin layer 67. The pitch 68 between each core of adjacent optical fibres 64 depends on the optimum pitch required for interconnection with an optical connector. In this case the pitch of the optical fibres 64 are required to be 250 micrometers for the highest possible yield for connection. Since the optical fibres 64 are 250 micrometers in diameter they are laid abutting one another in the communal channel 65.

When the optical fibres are laid in their respective channels as defined in the polyimide layer, the optical fibres can be retained, at least temporarily, in the channels using a rubber based adhesive such as cyanacrylate.

Figure 10:
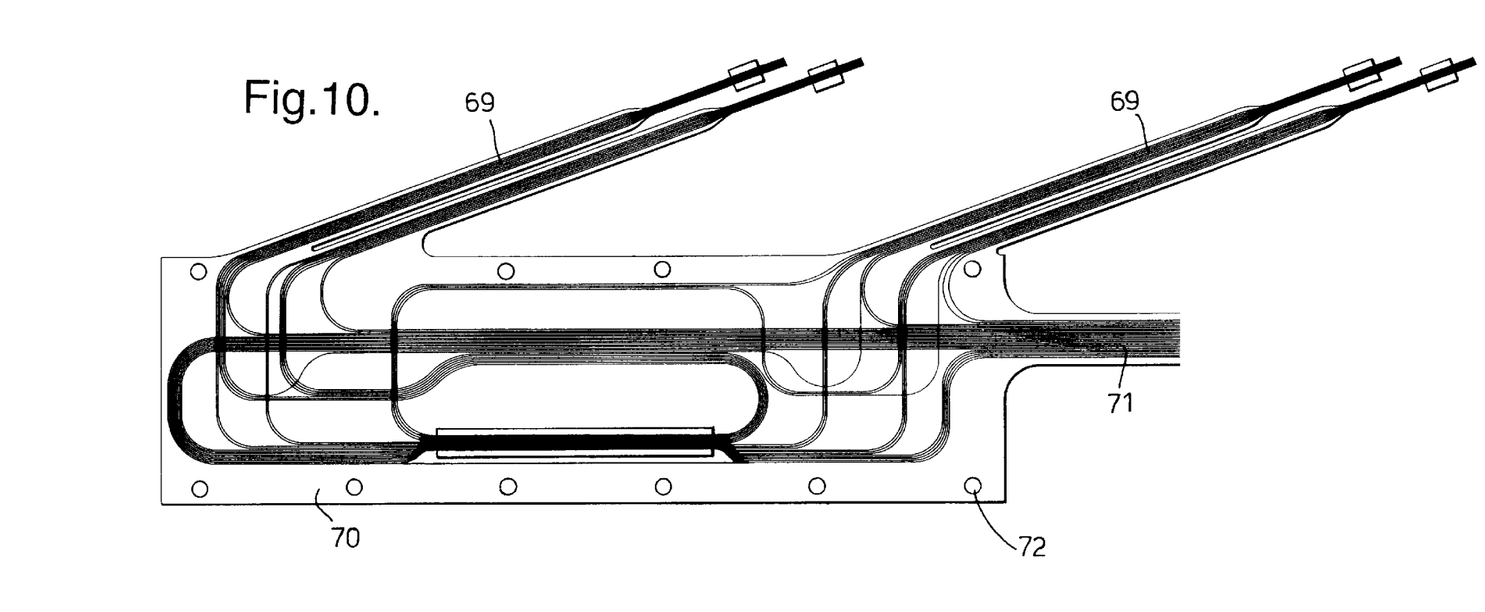
FIG. 10 illustrates in plan view the layout of optical fibres within the plane of the optical backplane.
Figure 11:
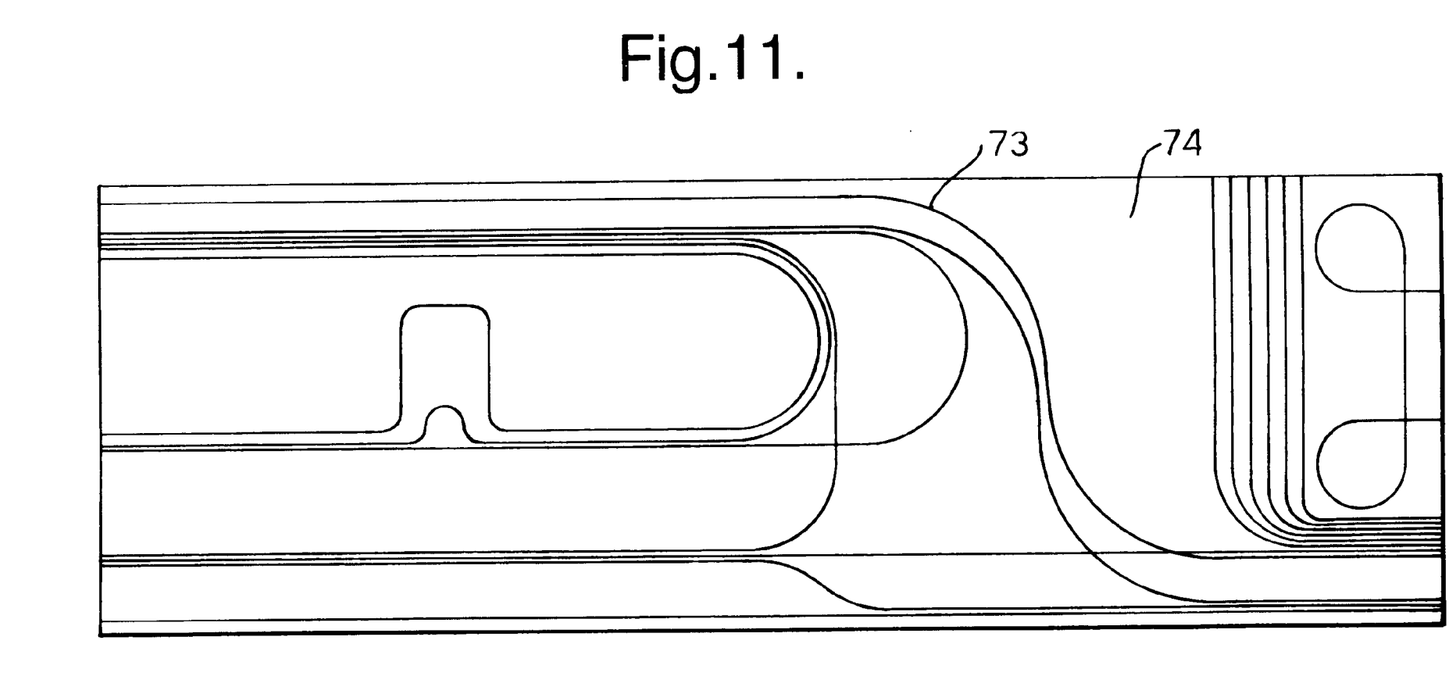
FIG. 11 illustrates in plan view the layout of channels within the plane of the polyimide layer.

FIG. 10 illustrates the entire optical backplane with flexible ribbons 69 extending from the rigid backplane 70 and the exposed optical fibres 71 for interconnection with optical connectors. A number of fixing apertures 72 are also shown for securing the optical backplane to a racking system (not shown).

FIG. 10 illustrates in plan defining channels 73 in a polyimide layer.

What we claim is:

1. An optical backplane, comprising:
    a layer of a material defining at least two channels within the plane of the layer;
    at least one optical fibre located within each of said channels; and
    a crossover region formed where at least two of said channels intersect, one of said channels being formed sufficiently deep to permit said optical fibre located in said one channel to cross underneath said optical fibre located within the other of said channels.

2. The optical backplane of claim 1, wherein said channels intersect substantially at a right angle in said crossover region.

3. The optical backplane of claim 2, wherein said channels are locally widened at said crossover region.

4. The optical backplane of claim 3, wherein said locally widened channels have portions filled with a set resin.

5. The optical backplane of claim 4, wherein a base for said deeper one of said channels is defined by a stop layer.

6. An optical backplane, comprising:
    a layer of a material defining at least two channels within the plane of the layer, each of said channels being formed by ablation of said material;
    at least one optical fibre located within each of said channels; and
    a crossover region formed where at least two of said channels intersect, one of said channels being formed sufficiently deep to permit said optical fibre located in said one channel to cross underneath said optical fibre located within the other of said channels.

7. The optical backplane of claim 6, wherein a base for at least one of said channels is defined by a stop layer.

8. The optical backplane of claim 6, wherein each said optical fibre is laid in respective said channels and retained in position using an adhesive.

9. The optical backplane of claim 6, wherein a bend in at least one of said channels has a radius greater than 10 mm.

10. An optical backplane, comprising:
    a layer of a material defining at least two channels within the plane of the layer;
    at least one optical fibre located within each of said channels;
    a crossover region formed where at least two of said channels intersect, one of said channels being formed sufficiently deep to permit said optical fibre located in said one channel to cross underneath said optical fibre located within the other of said channels; and
    a further layer of the material bonded to said layer to enclose each said optical fibre within its channel.

11. The optical backplane of claim 10, wherein said layers form a flexible structure.

12. The optical backplane of claim 11, wherein a rigid layer is bonded to one side of said flexible structure to provide a rigid structure.

13. The optical backplane of claim 12, wherein a further rigid layer is bonded to an opposite reverse side of said flexible structure.

14. The optical backplane of claim 13, wherein a printed circuit is carried by a surface of at least one of said layers.

15. The optical backplane of claim 14, wherein at least one of said layers has at least one aperture containing a component connected to said printed circuit.

16. The optical backplane of claim 15, wherein each said aperture is filled with a set resin.

17. The optical backplane of claim 13, wherein said rigid layers are formed from epoxy glass resin.

18. The optical backplane of claim 13, wherein said layers are bonded by an epoxy resin.

19. The optical backplane of claim 12, wherein said layers have at least one aperture containing an electro-optical component connected to at least one of said optical fibres.

20. The optical backplane of claim 19, wherein each aperture is filled with a set resin.

21. The optical backplane of claim 12, wherein said layers have at least one aperture containing an optical component connected to at least one of said optical fibres.

22. The optical backplane of claim 10, wherein said further layer of the material is formed from a cured resin which extends into each of said channels to enclose each said optical fibre.

23. The optical backplane of claim 10, wherein said material is formed from polyimide.

24. An optical backplane, comprising:
    a layer of a material defining at least two channels within the plane of the layer;
    at least one optical fibre located within each of said channels;
    a crossover region formed where at least two of said channels intersect, one of said channels being formed sufficiently deep to permit said optical fibre located in said one channel to cross underneath said optical fibre located within the other of said channels;
    a further layer of the material bonded to said layer to enclose each said optical fibre within its channel, and said layers forming a flexible structure;
    at least one rigid layer bonded to at least one side of said flexible structure to provide a rigid structure; and
    said flexible structure formed to extend beyond said rigid layer to define a flexible optical ribbon.

25. The optical backplane of claim 24, wherein said flexible optical ribbon terminates in an optical connector, and wherein at least one said optical fibre is located in a communal channel immediately adjacent said optical connector.

26. The optical backplane of claim 25, wherein each optical fibre is located in a laterally spaced individual channel which converges into the communal channel.

27. A method of manufacturing an optical backplane, comprising the steps of:
    defining at least two channels within the plane of a layer of a material;
    locating at least one optical fibre within each of said channels; and
    defining a crossover region for at least two of said channels by forming one of said channels sufficiently deep to permit said optical fibre located in said one channel to cross underneath said optical fibre within the other of said channels.

28. The method of claim 27; including forming said channels with locally widened portions in said crossover region.

29. The method of claim 28; including filling said locally widened portions of said channels with a setting resin.

30. The method of claim 27; including laying each said optical fibre in its said respective channel, and applying an adhesive between each said optical fibre and its respective channel.

31. The method of claim 27; including forming a bend in at least one of said channels with a radius greater than 10 mm.

32. A method of manufacturing an optical backplane, comprising the steps of:

forming at least two channels within the plane of a layer of a material by ablating said material;

locating at least one optical fibre within each of said channels; and defining a crossover region for at least two of said channels by forming one of said channels sufficiently deep to permit said optical fibre located in said one channel to cross underneath said optical fibre within the other of said channels.

33. The method of claim 32; including using a mask superimposed over said layer to expose only those areas of said material that are to be ablated.

34. The method of claim 33; including using an excimer laser to ablate said material.

35. The method of claim 34; including using a stop layer to define a base for at least one of the channels.

36. A method of manufacturing an optical backplane, comprising the steps of:

defining at least two channels within the plane of a layer of a material;

locating at least one optical fibre within each of said channels;

defining a crossover region for at least two of said channels by forming one of said channels sufficiently deep to permit said optical fibre located within said one channel to cross underneath said optical fibre within the other of said channels; and bonding a further layer of the material to said layer to enclose each said optical fibre.

37. The method of claim 36, wherein said layers form a flexible structure; and further including bonding a rigid layer to one side of said flexible structure.

38. The method of claim 37; including bonding a further rigid layer to an opposite reverse side of said flexible structure.

39. The method of claim 38; including introducing an epoxy resin between said layers and bonding them together under pressure over a surface area of said layers.

40. The method of claim 37; including forming a printed circuit on a surface of at least one of said layers.

41. The method of claim 40; including forming at least one aperture in at least one of said layers; positioning a component within said aperture; and connecting said component to said printed circuit.

42. The method of claim 37; including forming at least one aperture in at least one of said layers; positioning an optical component within said aperture; and connecting said component to at least one of said optical fibres.

43. The method of claim 37; including forming at least one aperture in at least one of said layers, positioning an electro-optical component within said aperture; and connecting said component to at least one of said optical fibres.

44. A method of manufacturing an optical backplane, comprising the steps of:

defining at least one channel within the plane of a layer of a material;

locating at least one optical fibre within said at least one channel;

bonding a further layer of the material to said layer to enclose said at least one optical fibre and to form a flexible structure;

bonding a rigid layer to one side of said flexible structure;

spacing said rigid layer from said flexible structure to which it is to bond, with spacer material in specified regions;

using a bond inhibiting agent to prevent bonding of said spacer material to either said rigid layer or to said flexible structure; and then removing portions of said rigid layer in said specified regions to expose portions of said flexible structure.

45. The method of claim 44; including defining said at least one channel in the exposed portions of said flexible structure such that the pitch between each optical fibre enables interconnection with a multi-way ribbon connector.

* * * * *